United States Patent
Hicks et al.

(10) Patent No.: US 11,106,567 B2
(45) Date of Patent: Aug. 31, 2021

(54) COMBINATORIC SET COMPLETION THROUGH UNIQUE TEST CASE GENERATION

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US); Eitan Farchi, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 16/256,394

(22) Filed: Jan. 24, 2019

(65) Prior Publication Data

US 2020/0242011 A1    Jul. 30, 2020

(51) Int. Cl.
*G06F 11/36*    (2006.01)

(52) U.S. Cl.
CPC ...... *G06F 11/3676* (2013.01); *G06F 11/3684* (2013.01); *G06F 11/3688* (2013.01); *G06F 11/3692* (2013.01)

(58) Field of Classification Search
CPC ............. G06F 11/3676; G06F 11/3684; G06F 11/3688; G06F 11/3692
USPC ........................................................ 714/38.1
See application file for complete search history.

(56) References Cited

U.S. PATENT DOCUMENTS

| | | |
|---|---|---|
| 5,153,881 A | 10/1992 | Bruckert |
| 5,185,877 A | 2/1993 | Bissett |
| 5,410,634 A | 4/1995 | Li |
| 5,694,540 A | 12/1997 | Humelsine |
| 5,758,061 A | 5/1998 | Plum |

(Continued)

FOREIGN PATENT DOCUMENTS

| | | | |
|---|---|---|---|
| JP | H05282272 A | 10/1993 | |
| JP | H07121498 A | 5/1995 | |

(Continued)

OTHER PUBLICATIONS

Wikipedia "all pairs testing" web page, from date Mar. 17, 2018, retrieved from https://web.archive.org/web/20180317024546/https://en.wikipedia.org/wiki/All-pairs_testing (Year: 2018).*

(Continued)

*Primary Examiner* — Yair Leibovich
(74) *Attorney, Agent, or Firm* — Cantor Colburn LLP; Teddi Maranzano (57) ABSTRACT

Systems, methods, and computer-readable media are described for expanding test space coverage for testing performed on a System Under Test (SUT) through iterative test case generation from combinatoric pairwise outputs. At each test case generation iteration, a new set of test vectors is generated that provides complete pairwise coverage of the test space but that does not include any overlapping test vector with any previously generated set of test vectors. As such, cumulative m-wise test space coverage (where $2 < m \leq n$) is incrementally increased through each iteration until the iterative process ceases when a desired percentage of m-wise test space coverage is achieved.

17 Claims, 4 Drawing Sheets

(56) References Cited

U.S. PATENT DOCUMENTS

| | | |
|---|---|---|
| 5,758,062 A | 5/1998 | McMahon |
| 6,182,245 B1 | 1/2001 | Akin et al. |
| 6,182,258 B1 | 1/2001 | Hollander |
| 6,378,097 B1 | 4/2002 | Fin et al. |
| 6,415,396 B1 | 7/2002 | Singh et al. |
| 6,601,018 B1 | 7/2003 | Logan |
| 6,718,286 B2 | 4/2004 | Rivin et al. |
| 6,718,485 B1 | 4/2004 | Reiser |
| 6,859,922 B1 | 2/2005 | Baker |
| 6,907,546 B1 | 6/2005 | Haswell et al. |
| 7,024,589 B2 | 4/2006 | Hartman et al. |
| 7,032,212 B2 | 4/2006 | Amir et al. |
| 7,093,238 B2 | 8/2006 | Givoni |
| 7,178,063 B1 | 2/2007 | Smith |
| 7,235,358 B2 | 6/2007 | Wohlgemuth |
| 7,315,634 B2 | 1/2008 | Martin |
| 7,363,495 B2 | 4/2008 | Wells |
| 7,386,839 B1 | 6/2008 | Golender |
| 7,552,425 B2 | 6/2009 | Bates et al. |
| 7,596,778 B2 | 9/2009 | Kolawa |
| 7,617,074 B2 | 11/2009 | Beish |
| 7,640,470 B2 | 12/2009 | Lammel |
| 7,640,740 B2 | 1/2010 | Lammel |
| 7,721,265 B1 | 5/2010 | Xu |
| 7,752,502 B2 | 7/2010 | Glee |
| 7,861,226 B1 | 12/2010 | Episkopos |
| 7,945,898 B1 | 5/2011 | Episkopos et al. |
| 7,958,400 B2 | 6/2011 | Ur |
| 7,962,798 B2 | 6/2011 | Locasto |
| 8,056,060 B2 | 11/2011 | Bicheno |
| 8,225,194 B2 | 7/2012 | Rechsteiner |
| 8,234,105 B1 | 7/2012 | Aldrich |
| 8,296,445 B1 | 10/2012 | Hackborn |
| 8,296,605 B2 | 10/2012 | John |
| 8,301,757 B2 | 10/2012 | Catlin |
| 8,370,816 B2 | 2/2013 | Farchi et al. |
| 8,479,171 B2 | 7/2013 | Ghosh |
| 8,504,997 B2 | 8/2013 | Tkachuk et al. |
| 8,527,813 B2 | 9/2013 | Budnik |
| 8,549,480 B2 | 10/2013 | Cohen et al. |
| 8,554,811 B2 | 10/2013 | Mariani |
| 8,639,625 B1 | 1/2014 | Ginter |
| 8,649,995 B2 | 2/2014 | Thulasidasan et al. |
| 8,666,723 B2 | 3/2014 | Xie |
| 8,694,958 B1 | 4/2014 | Potter |
| 8,756,460 B2 | 6/2014 | Blue et al. |
| 8,775,886 B2 | 7/2014 | Mellen |
| 8,806,450 B1 | 8/2014 | Maharana |
| 8,856,129 B2 | 10/2014 | Cai |
| 8,874,477 B2 | 10/2014 | Hoffberg |
| 8,935,673 B1 | 1/2015 | Ashkenazi |
| 8,949,674 B2 | 2/2015 | Mancoridis |
| 8,954,926 B2 | 2/2015 | Braun et al. |
| 8,954,930 B2 | 2/2015 | Kamenz |
| 8,966,453 B1 | 2/2015 | Zamfir |
| 8,997,061 B1 | 3/2015 | Davison |
| 9,009,538 B2 | 4/2015 | D'Alterio et al. |
| 9,037,915 B2 | 5/2015 | D'Alterio et al. |
| 9,063,899 B2 | 6/2015 | Epstein |
| 9,098,635 B2 | 8/2015 | Peri-Glass et al. |
| 9,104,804 B2 | 8/2015 | Best |
| 9,111,033 B2 | 8/2015 | Bates |
| 9,141,520 B2 | 9/2015 | Zheng |
| 9,202,005 B2 | 12/2015 | Goswami et al. |
| 9,286,313 B1 | 3/2016 | Sharangpani |
| 9,317,410 B2 | 4/2016 | Eilam et al. |
| 9,336,122 B2 | 5/2016 | Kilzer et al. |
| 9,454,466 B2 | 9/2016 | Ivrii et al. |
| 9,489,289 B2 | 11/2016 | Hu |
| 9,513,998 B2 | 12/2016 | Coronado |
| 9,529,701 B2 | 12/2016 | Ekambaram et al. |
| 9,600,241 B2 | 3/2017 | Shankar et al. |
| 9,600,401 B1 | 3/2017 | Haischt |
| 9,600,403 B1 | 3/2017 | Raz |
| 9,626,277 B2 | 4/2017 | Thangamani |
| 9,720,766 B2 | 8/2017 | Lee |
| 9,734,263 B2 | 8/2017 | Kohavi et al. |
| 9,779,013 B2 | 10/2017 | Narayan et al. |
| 9,857,959 B2 | 1/2018 | Dhawal |
| 9,864,675 B2 | 1/2018 | Ug |
| 9,916,414 B2 | 3/2018 | Jeong |
| 9,990,272 B2 | 6/2018 | Cooper |
| 9,996,452 B2 | 6/2018 | Cooper et al. |
| 10,061,685 B1 | 8/2018 | White |
| 10,073,763 B1 | 9/2018 | Raman |
| 10,152,479 B1 | 12/2018 | Granstrom |
| 10,270,748 B2 | 4/2019 | Briceno et al. |
| 10,296,446 B2 | 5/2019 | D'Andrea et al. |
| 10,338,993 B1 | 7/2019 | Lekivetz et al. |
| 10,383,553 B1 | 8/2019 | Glenn |
| 10,417,282 B1 | 9/2019 | Zuber |
| 10,430,318 B1 | 10/2019 | Ansari |
| 10,545,855 B1 | 1/2020 | Jayaswal |
| 10,560,539 B1 | 2/2020 | Loch et al. |
| 10,637,853 B2 | 4/2020 | Lindemann |
| 10,713,151 B1 | 7/2020 | Zinger et al. |
| 10,754,756 B2 | 8/2020 | Ocariza, Jr. et al. |
| 10,776,464 B2 | 9/2020 | Wilson |
| 2003/0233600 A1* | 12/2003 | Hartman ........ G01R 31/318307 714/32 |
| 2004/0154001 A1 | 8/2004 | Haghighat et al. |
| 2006/0070048 A1 | 3/2006 | Li et al. |
| 2006/0179386 A1 | 8/2006 | Pushpavanam |
| 2008/0065931 A1 | 3/2008 | Coulter |
| 2008/0163165 A1 | 7/2008 | Shitrit |
| 2008/0172652 A1 | 7/2008 | Davia et al. |
| 2009/0249123 A1 | 10/2009 | Chow |
| 2010/0023928 A1 | 1/2010 | Hentschel et al. |
| 2010/0100871 A1 | 4/2010 | Celeskey |
| 2010/0287534 A1 | 11/2010 | Vangala et al. |
| 2011/0016457 A1 | 1/2011 | Artzi et al. |
| 2011/0145653 A1 | 6/2011 | Broadfoot |
| 2012/0191443 A1 | 7/2012 | Amalfitano |
| 2012/0253728 A1 | 10/2012 | Chamas |
| 2012/0260132 A1 | 10/2012 | Blue |
| 2013/0125090 A1 | 5/2013 | Durand et al. |
| 2013/0152047 A1 | 6/2013 | Moorthi |
| 2014/0013307 A1 | 1/2014 | Hansson |
| 2014/0059081 A1 | 2/2014 | Farchi et al. |
| 2014/0095933 A1 | 4/2014 | Griesinger |
| 2014/0372083 A1 | 12/2014 | Hsu et al. |
| 2015/0094997 A1 | 4/2015 | Ivrii et al. |
| 2015/0106653 A1 | 4/2015 | Adler et al. |
| 2015/0378879 A1 | 12/2015 | Ding |
| 2016/0140027 A1 | 5/2016 | Ug |
| 2016/0378618 A1 | 12/2016 | Cmielowski et al. |
| 2017/0060734 A1 | 3/2017 | Raz et al. |
| 2017/0103013 A1 | 4/2017 | Grechanik |
| 2017/0132119 A1 | 5/2017 | Xu et al. |
| 2017/0199810 A1 | 7/2017 | Hamilton |
| 2017/0262361 A1 | 9/2017 | Francis |
| 2017/0270035 A1 | 9/2017 | Nie |
| 2018/0024911 A1 | 1/2018 | Kruszewski et al. |
| 2018/0052725 A1 | 2/2018 | Hannson |
| 2018/0095867 A1 | 4/2018 | Varadarajan et al. |
| 2018/0121336 A1 | 5/2018 | Ayyappan et al. |
| 2018/0293156 A1 | 10/2018 | Zeng |
| 2018/0300226 A1 | 10/2018 | Manolios |
| 2018/0314577 A1 | 11/2018 | Gorjiara et al. |
| 2018/0329807 A1 | 11/2018 | Atyam |
| 2019/0018761 A1 | 1/2019 | Ramraz |
| 2019/0332523 A1 | 10/2019 | Gefen |
| 2019/0370274 A1 | 12/2019 | Yokoyama |
| 2020/0201822 A1 | 6/2020 | Wang |
| 2020/0213199 A1 | 7/2020 | Sethi |
| 2020/0242011 A1 | 7/2020 | Hicks |
| 2020/0242012 A1 | 7/2020 | Hicks |
| 2020/0242013 A1 | 7/2020 | Hicks |

FOREIGN PATENT DOCUMENTS

| | | |
|---|---|---|
| JP | H07139507 A | 5/1995 |

(56) References Cited

FOREIGN PATENT DOCUMENTS

| WO | 2016138953 A1 | 9/2016 |
|---|---|---|
| WO | 2018162048 A1 | 9/2018 |

OTHER PUBLICATIONS

Wikipedia "Cartesian Product" web page, from date Jan. 15, 2019, retrieved from https://web.archive.org/web/20190115231627/https://en.wikipedia.org/wiki/Cartesian_product (Year: 2019).*
Anonymous, "A Method and System for Providing Collaborative Platform as a Service for Aiding Machine Learning Development," IP.com (IPCOM000256095D). Nov. 2, 2018. 5 pages.
Anonymous, "Black Hole Testing—Machine Learning Program Behavior Patterns from Massive Automated Test Results," IP.com (IPCOM000243987D). Nov. 4, 2015. 8 pages.
Anonymously Disclosed "A system and method for setting breakpoints automatically by comparing correct and incorrect runs" IP.com No. IPCOM000252399D, Publication Date: Jan. 8, 2018, 5 pages.
Anonymously Disclosed "Advanced Interrogative Debugger for data-centric domain", IP.com No. IPCOM000226865D, Publication Date: Apr. 23, 2013, 14 pages.
Anonymously Disclosed "Cognitive, Self-Instrumenting Code on Detection of an Issue" IP.com No. IPCOM000253277D; Publication Date: Mar. 19, 2018; 4 pgs.
Anonymously Disclosed "Method and system to find potential program defect based on run-time variable change analysis", IP.com No. IPCOM000248699D, Publication Date: Dec. 28, 2016, 8 pages.
Anonymously Disclosed "Method for a debugging tool for finding variable value in application stack", IP.com No. IPCOM000209789D, Publication Date: Aug. 15, 2011, 5 pages.
Anonymously Disclosed "Method to enable debugger breakpoint inside statement", IP.com No. IPCOM000206941D, Publication Date: May 13, 2011, 8 pages.
Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated as Related; Date Filed: Jul. 11, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification ", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
"CPC Cooperative Patent Classification, G06F Electrical Digital DAT Processing" of Apr. 2015, retrieved from https://www.cooperativepatentclassification.org/cpd (Year: 2015).
Bromme et al., "A Conceptual Framework for Testing Biometric Algorithms within Operating Systems' Authentication", ACM, pp. 273-280 (Year: 2002).
Rothermel et al., "Analyzing Regression Test Selection Techniques", IEEE, pp. 529-551 (Year: 1996).
Yimaz et al., "Moving forward with combinatorial interaction testing", Feb. 2014, 47(2), pp. 37-45.

(56) References Cited

OTHER PUBLICATIONS

Andalib et al., "A Novel Key Generation Scheme for Biometric Cryptosystems Using Fingerprint Minutiae," IEEE, pp. 1-6 (Year: 2013).

Anonymous, "Combining Combinatorial Models while Maintaining Full Coverage," Jun. 25, 2016, 5 Pages.

Anonymous, "Explaining a Combinatorial Test Plan Using Hole Analysis" May 20, 2012; 4 pages.

Anonymous, "Integration of Combinatorial Testing Design with Automated Testing to Develop Smart Automated Test Suites," Jan. 6, 2015, 3 pages.

Anonymous, "Method and System for Optimizing Combinatorial Test Design (CTD) to Test a Mobile Application in Different Devices," Feb. 10, 2015, 2 pages.

Biswas, "Network-on-Chip Intellectual Property Protection Using Circular Path-based Fingerprinting," ACM, pp. 1-22 (Year: 2020).

Bryant et al., "Verification of Arithmetic Circuits with Binary Moment Diagrams," Proceedings of the 32nd ACM/IEEE design automation conference, 535-541, 1995.

Bures et al., "Tapir: Automation Support of Exploratory Testing Using Model Reconstruction of the System Under Test," IEEE, pp. 557-580 (Year: 2018).

Chakrabarti et al., "Specification Based Regression Testing Using Explicit State Space Enumeration," IEEE, pp. 1-6 (Year: 2006).

Chua, "Resistance switching memories are memristors," Applied Physics A, vol. 102, No. 4, 2011, pp. 765-783.

Esmaeili et al., "A Robust and Fast Video Copy Detection System Using Content-Based Fingerprinting," pp. 213-226 (Year: 2011).

Fang et al., "Identifying Test Refactoring Candidates with Assertion Fingerprints," ACM, pp. 125-137 (Year: 2015).

Fujita et al., "Multi-Terminal Binary Decision Diagrams: An Efficient Data Structure for Matrix Representation," Formal Methods in System Design—FMSD, vol. 10, No. 2/3, pp. 149-169, 1997.

Giugno et al., "GraphGrep: A Fast and Universal Method for Querying Graphs," IEEE, pp. 112-115 (Year: 2002).

Graves et al., "An empirical study of regression test selection techniques," ACM Trans. Softw. Eng. Methodol., 184-208 (2001).

Grindal et al., "Combination testing strategies: a survey," Softw. Test. Verif. Reliab. 15(3), 167-199 (2005).

Gu et al., "Multi-Aspect, Robust, and Memory Exclusive Guest OS Fingerprinting," IEEE, pp. 380-394 (Year: 2014).

Jain et al., "Fingerprint Matching," IEEE, pp. 36-44 (Year: 2010).

Kuhn, R., "Practical Applications of Combinatorial Testing," Mar. 2012.

Lehmann et al., "A Generic Systolic Array Building Block for Neural Networks with On-Chip Learning," IEEE Transactions on Neural Networks, vol. 4., No. 3, 1993, pp. 400-407.

Li et al., "Training itself: Mixed-signal training acceleration for memristor-based neural network," 19th Asia and South Pacific Design Automation Conference (ASP-DAC), 2014, pp. 361-366.

Maughan, C., "Test Case Generation Using Combinatorial Based Coverage for Rich Web Applications," 2012.

Memon, Atif M., and Qing Xie. "Studying the fault-detection effectiveness of GUI test cases for rapidly evolving software." IEEE transactions on software engineering 31.10 (2005): pp. 884-896. (Year: 2005).

Mishchenko, A., "An Introduction to Zero-Suppressed Binary Decision Diagrams," Proceedings of the 12th Symposium on the Integration of Symbolic Computation and Mechanized Reasoning, 2001.

Orso, A. et al., "Scaling regression testing to large software systems," ACM BIGSOFT Software Engineering Notes 29.6 (2004); pp. 241-251. (Year: 2004).

Pershin et al., "Solving mazes with memristors: A massively parallel approach," Physical Review E, vol. 84, No. 4, 2011, 046703, 6 pages.

Ratha et al., "A Real-Time Matching System for Large Fingerprint Databases," IEEE, pp. 799-813 (Year: 1996).

Shu et al., "Testing Security Properties of Protocol Implementations—a Machine Learning Based Approach," IEEE, pp. 1-8 (Year: 2007).

Snelick et al., "Multimodal Biometrics: Issues in Design and Testing," ACM, pp. 68-72 (Year: 2003).

Soudry et al., "Memristor-Based Multilayer Neural Networks With Online Gradient Descent Training," IEEE Transactions on Neural Networks and Learning Systems, 2015.

Taneja, Kunal, et al. "eXpress: guided path exploration for efficient regression test generation." Proceedings of the 2011 International Symposium on Software Testing and Analysis. 2011. pp. 1-11 (Year: 2011).

Tsai et al., "Adaptive-Scenario-Based Object-Oriented Test Frameworks for Testing Embedded Systems," IEEE, pp. 1-16 (Year: 2002).

Tsai et al., "Scenario-Based Object-Oriented Test Frameworks for Testing Distributed Systems," IEEE, pp. 1-7 (Year: 2000).

Wilmor, D. et al, "A safe regression test selection technique for database-driven applications." 21st IEEE International Conference on Software Maintenance (ICSM'05). IEEE, 2005, pp. 1-10 (Year: 2005).

Yi, Q. et al., "A synergistic analysis method for explaining failed regression tests," 2015 IEEE/ACM 37th IEEE International Conference on Software Engineering. vol. 1. IEEE, 2015 pp. 257-267 (Year: 2015).

Zhong et al., "TestSage: Regression Test Selection for Large-scale Web Service Testing," IEEE, pp. 430-440 (Year: 2019).

\* cited by examiner

COMBINATORIC SET COMPLETION THROUGH UNIQUE TEST CASE GENERATION

BACKGROUND

The present invention relates generally to test case generation, and more particularly, to obtaining desired higher order test space coverage through recursive test case generation on pairwise combinatoric outputs.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester. Despite this, CTD testing techniques suffer from various drawbacks, technical solutions to which are described herein.

SUMMARY

In one or more example embodiments, a method for expanding test space coverage for a System Under Test (SUT) is disclosed. The method includes modeling inputs to the SUT as a plurality of attributes, where each attribute is eligible to take on a respective one or more attribute values and where a Cartesian product space including a collection of all possible combinations of attribute values represents an initial test space. The method further includes generating, from the initial test space, an initial set of test vectors that provides complete pairwise coverage across all of the attribute values. The method additionally includes generating an initial set of test cases corresponding to the initial set of test vectors and executing the initial set of test cases. The method further includes reducing the initial test space to obtain a reduced test space at least in part by excluding each combination of attribute values that corresponds to a respective test vector in the initial set of test vectors and generating, from the reduced test space, a new set of test vectors that provides complete pairwise coverage across all of the attribute values.

In one or more other example embodiments, a system for expanding test space coverage for a System Under Test (SUT) is disclosed. The system includes at least one memory storing computer-executable instructions and at least one processor configured to access the at least one memory and execute the computer-executable instructions to perform a set of operations. The operations include modeling inputs to the SUT as a plurality of attributes, where each attribute is eligible to take on a respective one or more attribute values and where a Cartesian product space including a collection of all possible combinations of attribute values represents an initial test space. The operations further include generating, from the initial test space, an initial set of test vectors that provides complete pairwise coverage across all of the attribute values. The operations additionally include generating an initial set of test cases corresponding to the initial set of test vectors and executing the initial set of test cases. The operations further include reducing the initial test space to obtain a reduced test space at least in part by excluding each combination of attribute values that corresponds to a respective test vector in the initial set of test vectors and generating, from the reduced test space, a new set of test vectors that provides complete pairwise coverage across all of the attribute values.

In one or more other example embodiments, a computer program product for expanding test space coverage for a System Under Test (SUT) is disclosed. The computer program product includes a non-transitory storage medium readable by a processing circuit, the storage medium storing instructions executable by the processing circuit to cause a method to be performed. The method includes modeling inputs to the SUT as a plurality of attributes, where each attribute is eligible to take on a respective one or more attribute values and where a Cartesian product space including a collection of all possible combinations of attribute values represents an initial test space. The method further includes generating, from the initial test space, an initial set of test vectors that provides complete pairwise coverage across all of the attribute values. The method additionally includes generating an initial set of test cases corresponding to the initial set of test vectors and executing the initial set of test cases. The method further includes reducing the initial test space to obtain a reduced test space at least in part by excluding each combination of attribute values that corresponds to a respective test vector in the initial set of test vectors and generating, from the reduced test space, a new set of test vectors that provides complete pairwise coverage across all of the attribute values.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the invention relate to, among other things, devices, systems, methods, computer-readable media, techniques, and methodologies for expanding test space coverage for testing performed on a System Under Test (SUT) through iterative test case generation from combinatoric pairwise outputs. The SUT may be a hardware system or a software system. In example embodiments, at each test case generation iteration, a new set of test vectors is generated that provides complete pairwise coverage of the test space but that does not include any overlapping test vector with any previously generated set of test vectors. As such, cumulative m-wise test space coverage (where m>2) is incrementally increased at each iteration until the iterative process ceases when a desired amount of m-wise test space coverage is achieved. M-wise test space coverage (where m>2) may be referred to herein as a higher order test space coverage as compared to pairwise coverage.

In example embodiments, inputs to a SUT are modeled as a collection of attribute-value pairs. More specifically, inputs to a SUT can be modeled as a collection of attributes, each of which is eligible to take on one or more corresponding attribute values to form attribute-value pairs. In example embodiments, the entire Cartesian product space that contains all possible combinations of attribute-value pairs can be reduced to a smaller set of test vectors that provides complete pairwise coverage of the test space across all attribute values. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of unique combinations of attribute values would be 4*3*3*2=72. Thus, in this illustrative example, the entire Cartesian product space would include 72 different combinations of attribute values. As previously noted, these 72 different combinations can be reduced down to a smaller set of combinations that still provide complete pairwise coverage of the Cartesian product space. For instance, the 72 different combinations can be reduced down to 12 distinct combinations that together include every possible pairwise interaction of attribute values. It should be appreciated that a set of test vectors that provides complete m-wise coverage across the attribute values can also be generated (where m>2), but would require a greater number of test vectors that increases logarithmically as m increases. In order to achieve complete n-wise coverage across all attribute values (where n represents a total number of attributes modeled), a set of test vectors containing all possible combinations of attribute values in the Cartesian product test space (potentially excluding any combination that violates an architectural restriction as will be described in more detail later) would need to be generated.

In example embodiments, the entire Cartesian product space including all combinations of attribute values are first reduced down to an initial set of Combinatorial Test Design (CTD) test vectors that provides complete pairwise coverage across all attribute values. In example embodiments, this initial set of CTD vectors provides partial but not complete m-wise coverage of the test space, where 2<m≤n, and n represents the total number of attributes being modeled. For instance, this initial set of CTD vectors may provide 10% 3-wise coverage of the test space, 5% 4-wise coverage of the test space, and so forth. In example embodiments, the amount of m-wise coverage provided by a given set of CTD vectors that provides complete pairwise coverage progressively decreases as m increases.

In example embodiments, a binary decision diagram or the like may be used to perform the reduction and identify the reduced set of CTD vectors that provides complete pairwise coverage and partial m-wise coverage, where 2<m≤n. In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute. The set of CTD vectors that is generated, however, may not be unique. That is, in example embodiments, multiple different sets of CTD vectors, each of which provides complete pairwise coverage, can be generated. Example embodiments utilize this aspect to recursively (also referred to herein as iteratively) generate new sets of CTD vectors, each of which provides complete pairwise coverage, such that the amount of cumulative m-wise coverage that is obtained (where 2 m≤n) is incrementally increased at each iteration.

In complex hardware or software systems, the total number of attributes and corresponding candidate attribute values that the attributes can take on may be quite large, in which case, the total number of possible combinations of attribute values making up the entire Cartesian product space may be astronomically large, making it practically infeasible to test all possible combinations. However, in accordance with example embodiments, cumulative m-wise coverage of the test space (where 2<m≤n) can be iteratively increased through the generation of a new unique set of CTD test vectors at each iteration that provides complete pairwise coverage. In example embodiments, new sets of CTD vectors can be iteratively generated until the desired amount of cumulative m-wise coverage is obtained. In example embodiments, cumulative m-wise coverage refers to the amount of m-wise coverage provided together by all sets of CTD vectors that are generated across all iterations.

In example embodiments, once the initial set of CTD test vectors is generated, it is used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector. In example embodiments, the test cases are then executed.

As previously noted, in example embodiments, the initial set of CTD vectors that is generated provides complete pairwise coverage but only partial m-wise coverage (where 2<m≤n). In accordance with example embodiments, a new set of CTD vectors may be generated that also provides complete pairwise coverage. This new set of CTD vectors may be unique from the initial set of CTD vectors. More specifically, in example embodiments, the new set of CTD vectors may contain no test vector that contains the exact same combination of attribute values as any test vector in the initial set of CTD vectors.

In example embodiments, a reduced test space may be determined from the initial test space. As previously noted, the initial test space may include the entire Cartesian product space containing all possible combinations of attribute values (potentially excluding any combination that violates an architectural restriction on the SUT). The reduced test space may be generated by excluding, from the initial test space, each combination of attribute values that corresponds to a test vector in the initial set of CTD vectors. In example embodiments, the new set of CTD vectors can be generated from this reduced test space, thereby ensuring that no test vector in the new set of CTD vectors includes the exact same combination of attribute values as any test vector in the initial set of test vectors. In example embodiments, a corresponding new set of test cases is generated from the new set of CTD vectors, and this new set of test cases is executed.

In example embodiments, the initial set of CTD vectors (and the corresponding initial set of test cases) provide complete pairwise coverage but only partial m-wise coverage (where 2<m≤n). Similarly, the new set of CTD vectors (and the corresponding new set of test cases) also provide complete pairwise coverage but only partial m-wise coverage. However, the new set of CTD vectors and corresponding new test cases increase the amount of cumulative m-wise coverage (where 2<m≤n) that is obtained by expanding on the m-wise coverage provided by the initial set of CTD vectors and corresponding initial test cases. This increase in the cumulative m-wise coverage is achieved at least in part because the new set of CTD vectors is unique as compared to the initial set of CTD vectors, that is, the two sets—while each provides complete pairwise coverage—do not contain any test vector having the exact same combination of attribute values. In this manner, the new set of test cases expands the portion of the test space covered by the initial set of test cases, thereby increasing the cumulative amount of m-wise coverage that is obtained (where 2<m≤n).

In example embodiments, the process described above can be performed iteratively, with a new unique set of CTD vectors and corresponding test cases being generated at each iteration. The set of CTD vectors generated at each iteration may be unique with respect to each set of CTD vectors generated at each prior iteration, that is, the set of CTD vectors generated at each iteration may contain no test vector having the exact same combination of attribute values as any previously generated test vector at any prior iteration. In example embodiments, this can be ensured by reducing the test space at each iteration by excluding from the test space associated with the most recent prior iteration each combination of attribute values corresponding to a test vector generated during the most recent prior iteration. Thus, in this manner, the cumulative amount of m-wise coverage obtained is increased at each iteration. The process may continue iteratively until a desired amount of cumulative m-wise coverage is obtained for a given m>2. For instance, the iterative process may continue until complete 3-wise coverage is obtained; until 75% 4-wise coverage is obtained; and so forth.

In example embodiments, a set of test cases that provides complete pairwise coverage, for example, does not ensure that a higher order defect/fault (e.g., a 3-wise defect that occurs based on the interaction of three different attribute values) will be detectable based on the execution results for the set of test cases. In particular, a set of cases that provides complete pairwise coverage provides only partial higher order coverage (e.g., partial 3-wise coverage), and thus, a defect that occurs, for example, based on a 3-way interaction of attribute values would only be exposed if the partial 3-wise coverage provided by the set of test cases includes that 3-way interaction of attribute values. In particular, the defect would be exposed if the set of test cases happens to include a test case that covers the particular combination of three attribute values that produces the defect. Example embodiments address this technical problem by incrementally increasing the cumulative higher order test coverage that is obtained by generating a unique set of test cases that provides complete pairwise coverage at each iteration. Thus, the likelihood that a higher order defect is exposed increases with each iteration as the cumulative higher order test coverage expands.

In example embodiments, architectural restrictions may apply to the SUT. Architectural restrictions may include any of a variety of restrictions on inputs to the SUT. For instance, an example restriction may be that if a given attribute has a particular attribute value, then one or more other attributes are excluded from having certain attribute value(s). Another example architectural restriction may be that if a given attribute has a particular attribute value, then one or more other attributes must have certain attribute value(s). Yet another example architectural restriction may be that a new attribute is introduced if and only if a particular attribute has a particular attribute value. It should be appreciated that the above examples of architectural restrictions are merely illustrative and not exhaustive.

In example embodiments, architectural restrictions may be taken into account as part of generating the initial test space. That is, in example embodiments, any combination of attribute values that violates an architectural restriction may be excluded from the entire Cartesian product space representing all combinations of attribute values in order to obtain the initial test space from which the initial set of CTD vectors are generated. At a next iteration, the reduced test space that excludes combinations of attribute values corresponding to the initial set of CTD vectors can be generated from the initial test space that itself excludes combination(s) that violate architectural restriction(s). Further, in example embodiments, for each subsequent iteration, a new reduced test space may be obtained by excluding combinations corresponding to the set of CTD vectors generated at the most recent prior iteration from the reduced test space associated with the most recent prior iteration. In this manner, it can be ensured that no combination of attribute values that violates an architectural restriction is included in any of the sets of CTD vectors generated across all iterations.

It should be noted that, in certain example embodiments in which architectural restrictions apply, there may be an iteration at which the set of CTD vectors generated does not provide complete pairwise coverage. For instance, if there are only four combinations of attribute values in the entire Cartesian product space that include a particular pairwise relationship, and a respective CTD vector and corresponding test case has been generated for each such combination over the course of prior iterations, then the set of CTD vectors generated at a current iteration would not include that particular pairwise relationship, and thus, would not provide complete pairwise coverage. In example embodiments, this can be addressed by randomly selecting the set of CTD vectors from the entire Cartesian product space at each iteration—where the entire Cartesian product space may be reduced initially to eliminate any combination of attribute values that violates a restriction—and flagging or otherwise denoting each combination for which a corresponding CTD vector has been generated but not excluding that combination from being selected for generation of a CTD vector in subsequent iterations. In this manner, it can be ensured that enough combinations of attribute values are available for selection to generate corresponding CTD vectors that provide complete pairwise coverage at any iteration in the process.

Example embodiments of the invention include various technical features that yield technical effects that provide various improvements to computer technology. For instance, example embodiments of the invention include the technical feature of iteratively generating unique new sets of test vectors and corresponding sets of test cases that provide complete pairwise coverage of a test space from prior combinatoric pairwise outputs, or more specifically, generating unique new sets of test vectors that exclude any test vector included in any previously generated set of test vectors that provides complete pairwise coverage. This technical feature yields the technical effect of incrementally increasing the cumulative m-wise coverage (where $2<m \leq n$) that is obtained across each iteration. This technical effect represents an improvement to computer technology because it incrementally increases the amount of higher order coverage of the test space without having to generate sets of test vectors that provide complete higher order test coverage. That is, the technical feature of generating a unique set of test vectors at each iteration that provides complete pairwise coverage yields the technical effect of continually increasing the amount of m-wise coverage that is obtained (where $2<m \leq n$), which constitutes an improvement to computer technology and an improvement to the functioning of a computer. In addition, the technical effect of incrementally increasing the cumulative m-wise coverage increases the likelihood that a higher order defect is exposed with each iteration, which addresses a technical problem with test cases that provide complete pairwise coverage but only partial higher order coverage, and thus, constitutes an improvement to computer technology.

Figure 1:
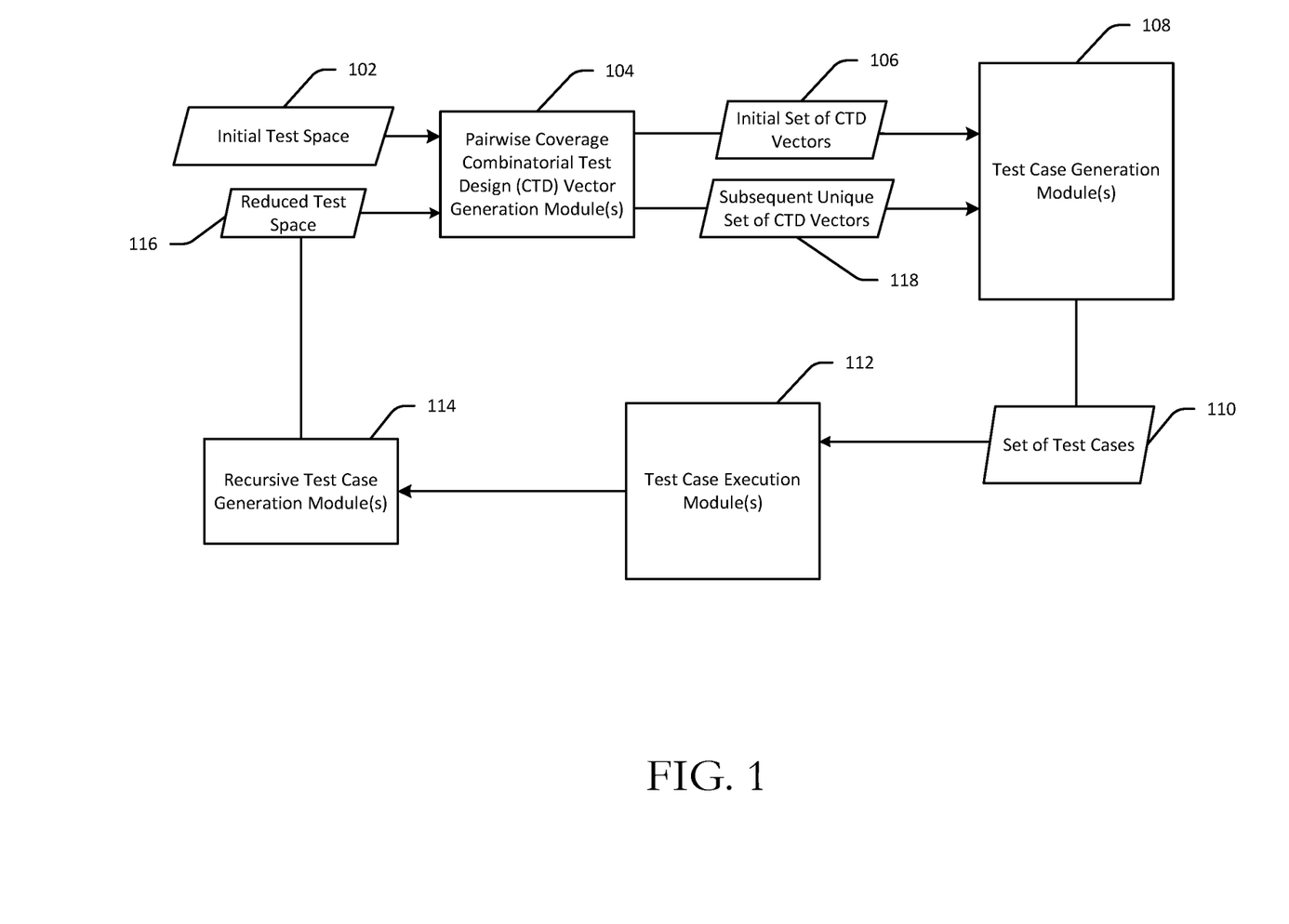
FIG. 1 is a schematic hybrid data flow/block diagram illustrating iterative test case generation from combinatoric pairwise outputs in accordance with one or more example embodiments of the invention.
Figure 3:
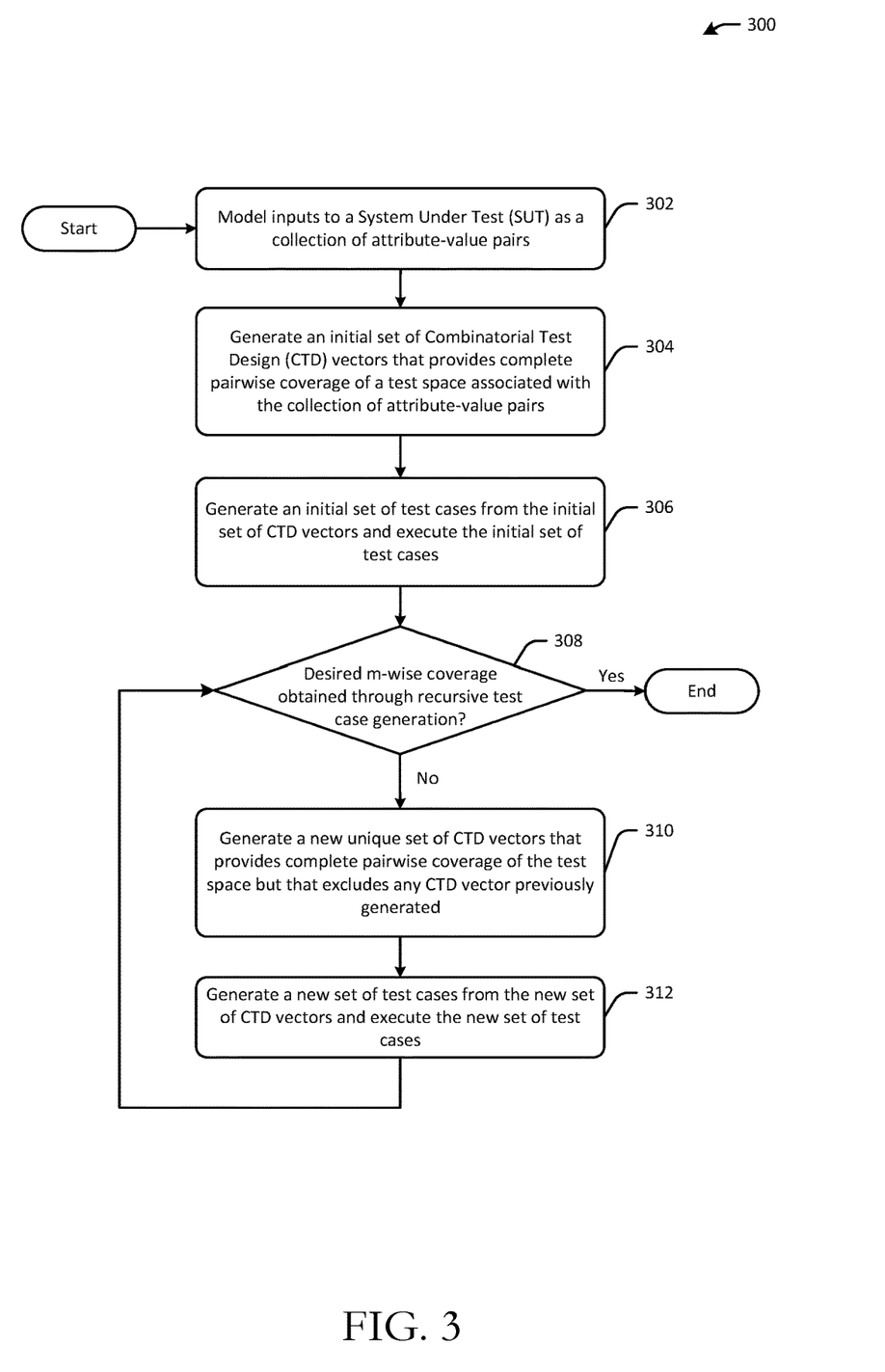
FIG. 3 is a process flow diagram of an illustrative method for iteratively generating test cases from combinatoric pairwise outputs in accordance with one or more example embodiments of the invention.

FIG. 1 is a schematic hybrid data flow/block diagram illustrating iterative test case generation from combinatorics pairwise outputs in accordance with one or more example embodiments of the invention. FIG. 3 is a process flow diagram of an illustrative method 300 or iteratively generating test cases from combinatorics pairwise outputs in accordance with one or more example embodiments of the invention. FIG. 3 will be described in conjunction with FIG. 1 hereinafter.

Illustrative methods in accordance with example embodiments of the invention and corresponding data structures (e.g., program modules) for performing the methods will now be described. It should be noted that each operation of the method 300 depicted in FIG. 3 may be performed by one or more of the program modules or the like depicted in FIG. 1 or FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 3 in conjunction with FIG. 1, at block 302 of the method 300, in example embodiments, inputs to a SUT are modeled as a collection of attribute-value pairs. More specifically, inputs to a SUT can be modeled as a collection of attributes, each of which is eligible to take on one or more corresponding attribute values to form attribute-value pairs. In example embodiments, the collection of all possible unique combinations of attribute values represents an entire Cartesian product space.

In certain example embodiments, such as those in which there are no architectural restrictions on the SUT, the entire Cartesian product space represents an initial test space 102. In other example embodiments, any combination that violates an architectural restriction is excluded from the entire Cartesian product space to obtain the initial test space 102.

At block 304 of the method 300, in example embodiments, the initial test space 102 containing all valid combinations of attribute values is reduced to a smaller initial set of CTD vectors 106 that provides complete pairwise coverage across all attribute values. More specifically, in example embodiments, computer-executable instructions of one or more pairwise coverage CTD vector generation modules 104 are executed at block 304 to generate the initial set of CTD test vectors 106, which provides complete pairwise coverage but includes a substantially reduced number of test vectors as compared to the total number of valid combinations of attribute values in the initial test space 102.

For instance, if it is assumed that four different attributes A, B, C, and D are modeled, and if it is further assumed that attribute A can take on four distinct values; attribute B can take on four distinct values; attribute C can take on three distinct values; and attribute D can take on two distinct values, then the total number of unique combinations of attribute values would be 4*4*3*2=96. Thus, in this illustrative example, the entire Cartesian product space would include 96 different unique combinations of attribute values. The initial test space 102 may include all 96 combinations or a lesser number if any combination(s) is excluded that violates an architectural restriction on the SUT. At block 304 of the method 300, the total number of combinations in the initial test space 102 can be reduced down to a smaller set of combinations that still provide complete pairwise coverage of the test space. For instance, the 96 different combinations can be reduced down to 16 distinct combinations included in the initial set of CTD vectors 106 that together include every possible pairwise interaction of attribute values.

In example embodiments, the initial set of CTD vectors 106 provides partial but not complete m-wise coverage of the test space, where $2<m \leq n$, and n represents the total number of attributes being modeled. For instance, the initial set of CTD vectors 106 may provide 10% 3-wise coverage of the test space, 5% 4-wise coverage of the test space, and so forth. In example embodiments, the amount of m-wise coverage provided by a given set of CTD vectors that provides complete pairwise coverage progressively decreases as m increases.

In example embodiments, a binary decision diagram or the like may be used to perform the reduction and identify the reduced set of CTD vectors 106 that provides complete pairwise coverage and partial m-wise coverage, where $2<m \leq n$ . . . . In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute.

Figure 2:
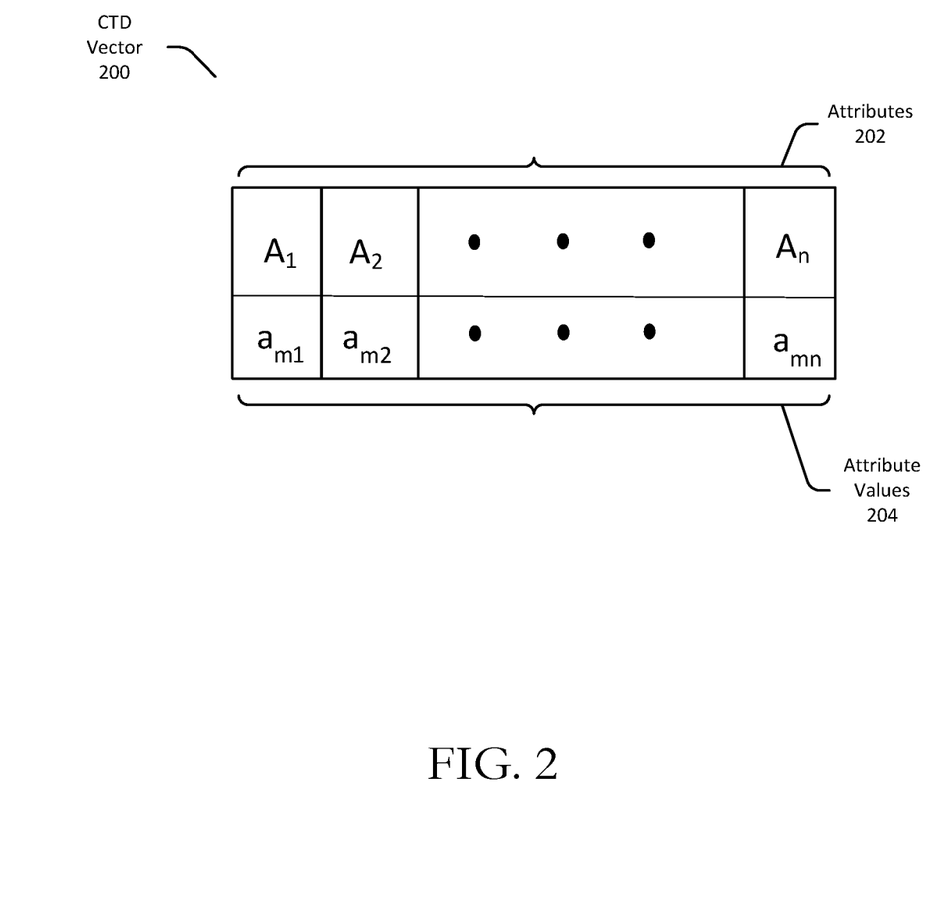
FIG. 2 is a schematic diagram of an example Combinatorial Test Design (CTD) vector in accordance with one or more example embodiments of the invention.

FIG. 2 depicts an example generic CTD vector 200 of the type that may be included in the set of CTD vectors 106. The example CTD vector 200 includes a plurality of attributes 202. As previously described, the attributes 202 may be used to model inputs to a SUT. The attributes 202 may be associated with attribute values 204. In particular, each attribute 202 may have a corresponding attribute value 204, which may be one of one or more candidate attribute values that the attribute is allowed to take on.

Referring again to FIG. 3, at block 306 of the method 300, in example embodiments, a corresponding set of test cases 110 is generated from the initial set of CTD test vectors 106 and the set of test cases 110 is executed. More specifically, at block 306, in example embodiments, computer-executable instructions of one or more test case generation modules 108 are executed to generate a respective corresponding test case for each CTD vector in the initial set of CTD vectors 106. Each test case may be designed to test the interactions among the particular combination of attribute values contained in the corresponding CTD vector. Then, in example embodiments, computer-executable instructions of one or more test case execution modules 112 are executed to execute the set of test cases 110.

Then, at block 308 of the method 300, in example embodiments, computer-executable instructions of one or more recursive test case generation modules 114 are executed to determine whether a desired amount of cumulative m-wise coverage (where $2<m\le n$) has been obtained at this point in the method 300. As previously noted, in example embodiments, the initial set of CTD vectors 106 that is generated provides complete pairwise coverage but only partial m-wise coverage (where $2<m\le n$). Because the initial set of CTD vectors 106 is generated at a first iteration of the method 300, the amount of partial m-wise coverage provided by the initial set of CTD vectors 106 also represents the cumulative amount of m-wise coverage obtained at this point in the process.

In response to a negative determination at block 308 indicating that a desired amount of cumulative m-wise coverage has not been achieved, the method 300 may proceed to block 310, where, in example embodiments, computer-executable instructions of the recursive test case generation module(s) 114 are executed to generate a new unique set of CTD vectors 118 that provides complete pairwise coverage but that does not include any CTD test vector present in the initial set of CTD vectors 106. More specifically, in example embodiments, the new unique set of CTD vectors 118 contains no test vector that includes the exact same combination of attribute values as any test vector in the initial set of CTD vectors 106. Then, at block 312 of the method 300, in example embodiments, computer-executable instructions of the test case generation module(s) 108 are executed to generate a new set of test cases 110 corresponding to the new set of CTD vectors 118, and computer-executable instructions of the test case execution module(s) 112 are executed to execute the corresponding new set of test cases 110.

More specifically, in example embodiments, at block 310 of the method 300, computer-executable instructions of the recursive test case generation module(s) 114 are executed to generate a reduced test space 116 from the initial test space 102. As previously noted, the initial test space 102 may include the entire Cartesian product space containing all possible combinations of attribute values (potentially excluding any combination that violates an architectural restriction on the SUT). The reduced test space 116 may be generated by excluding, from the initial test space 102, each combination of attribute values that corresponds to a test vector in the initial set of CTD vectors 106. In example embodiments, the new set of CTD vectors 118 can then be generated from this reduced test space 116, thereby ensuring that no test vector in the new set of CTD vectors 118 includes the exact same combination of attribute values as any test vector in the initial set of CTD vectors 106.

In example embodiments, the initial set of CTD vectors 106 (and the corresponding initial set of test cases 110) provide complete pairwise coverage but only partial m-wise coverage (where $2<m\le n$). Similarly, the new set of CTD vectors 118 (and the corresponding new set of test cases 110) also provide complete pairwise coverage but only partial m-wise coverage. However, the new set of CTD vectors 118 and the corresponding new test cases 110 increase the amount of cumulative m-wise coverage (where $2<m\le n$) that is obtained by expanding on the m-wise coverage provided by the initial set of CTD vectors 106 and the corresponding initial test cases 110. This increase in the cumulative m-wise coverage is achieved at least in part because the new set of CTD vectors 118 is unique as compared to the initial set of CTD vectors 106, that is, the two sets—while each provides complete pairwise coverage—do not contain any test vector having the exact same combination of attribute values. In this manner, the new set of test cases expands the portion of the test space covered by the initial set of test cases, thereby increasing the cumulative amount of m-wise coverage that is obtained (where $2<m\le n$).

From block 312, the method 300 proceeds again to block 308, where a determination is once again made as to whether a desired amount of cumulative m-wise coverage has been obtained. In example embodiments, the method 300 can proceed iteratively, with a new unique set of CTD vectors 118 and a corresponding new set of test cases 110 being generated at each iteration. The set of CTD vectors 118 generated at each iteration may be unique with respect to each set of CTD vectors generated at each prior iteration. That is, the set of CTD vectors generated at each iteration may contain no test vector having the exact same combination of attribute values as any previously generated test vector at any prior iteration. In example embodiments, this can be ensured by further reducing the test space at each iteration by excluding, from the reduced test space associated with the most recent prior iteration, each combination of attribute values corresponding to a CTD test vector generated during the most recent prior iteration. Thus, in this manner, the cumulative amount of m-wise coverage obtained is increased at each iteration. The method 300 may continue iteratively until a desired amount of cumulative m-wise coverage is obtained for a given m>2, at which point, a positive determination is made at block 308 and the method 300 ends. For instance, the iterative process may continue until complete 3-wise coverage is obtained; until 75% 4-wise coverage is obtained; and so forth.

In example embodiments, architectural restrictions may be taken into account as part of generating the initial test space 102. That is, in example embodiments, any combination of attribute values that violates an architectural restriction may be excluded from the entire Cartesian product space representing all combinations of attribute values in order to obtain the initial test space 102 from which the initial set of CTD vectors 106 is generated. At a next iteration, the reduced test space 116 that excludes combinations of attribute values corresponding to the initial set of CTD vectors 106 can be generated from the initial test space 102 that itself excludes combination(s) that violate architectural restriction(s). Further, in example embodiments, for each subsequent iteration, a new reduced test space 116 may be obtained by excluding combinations corresponding to the set of CTD vectors generated at the most recent prior iteration from the reduced test space 116 associated with the most recent prior iteration. In this manner, it can be ensured that no combination of attribute values that violates an architectural restriction is represented in any CTD vector generated at any iteration.

It should be noted that, in certain example embodiments in which architectural restrictions apply, there may be an iteration at which the set of CTD vectors generated does not provide complete pairwise coverage. For instance, if there are only four combinations of attribute values in the entire Cartesian product space that include a particular pairwise relationship, and a respective CTD vector and corresponding test case has been generated for each such combination over the course of prior iterations, then the set of CTD vectors generated at a current iteration would not include that particular pairwise relationship, and thus, would not provide complete pairwise coverage. In example embodiments, this can be addressed by randomly selecting the set of CTD vectors from the entire Cartesian product space at each iteration—where the entire Cartesian product space may be reduced initially to eliminate any combination of attribute values that violates a restriction—and flagging or otherwise denoting each combination for which a corresponding CTD vector has been generated but not excluding that combination from being selected for generation of a CTD vector in subsequent iterations. In this manner, it can be ensured that enough combinations of attribute values are available for selection to generate corresponding CTD vectors that provide complete pairwise coverage at any iteration in the process.

In addition, in example embodiments, if the underlying codebase changes, then the method 300 may need to begin again from the first iteration. That is, if the underlying codebase changes, an initial set of CTD vectors 106 may again be generated from the initial test space 102, and the method 300 may proceed iteratively as described above. The initial set of CTD vectors 106 generated when the method 300 restarts after changes to the underlying codebase occur may be the same initial set of CTD vectors previously generated prior to the changes to the codebase or a new initial set of CTD vectors.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 4:
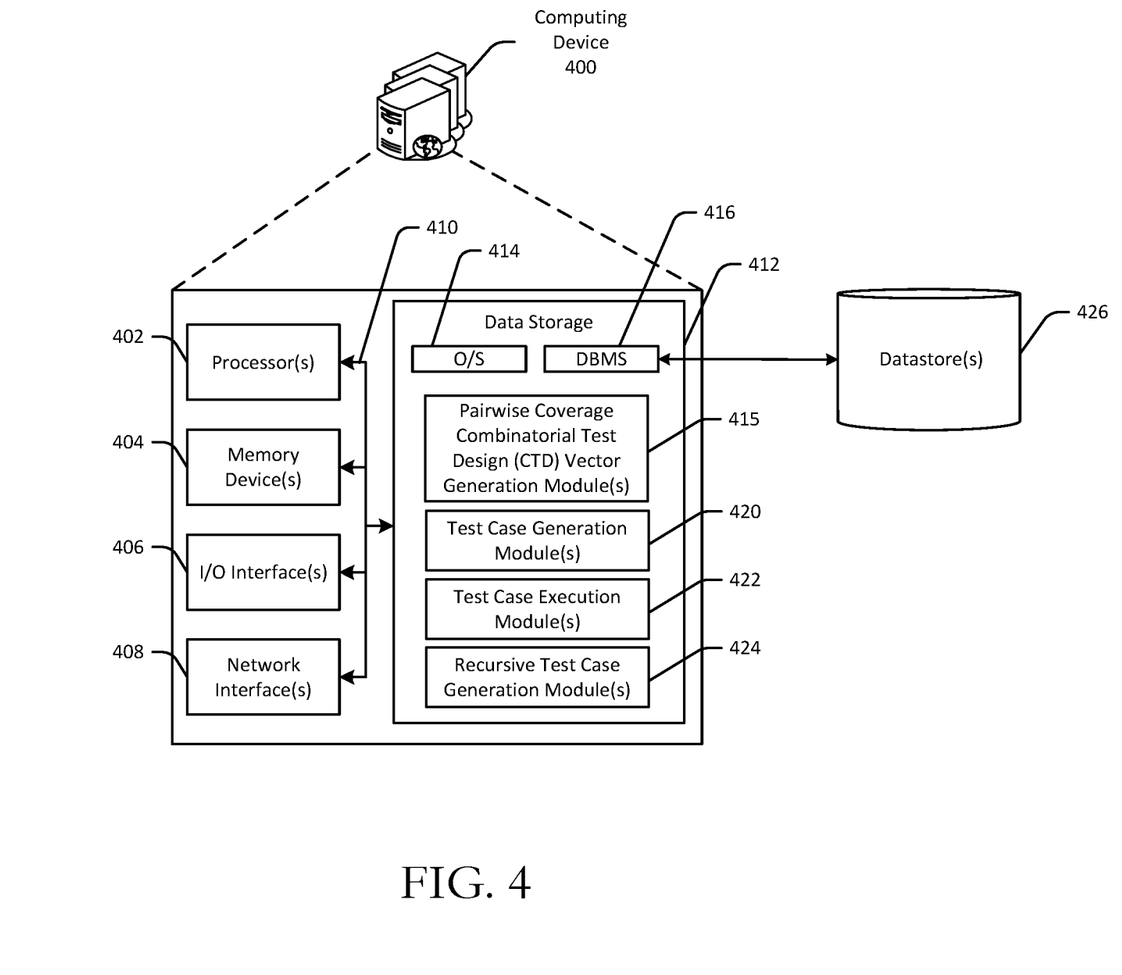
FIG. 4 is a schematic diagram of an illustrative computing device configured to implement one or more example embodiments of the invention.

FIG. 4 is a schematic diagram of an illustrative computing device 400 configured to implement one or more example embodiments of the invention. The illustrative computing device 400 may include a server or collection of servers; a personal computer; a handheld device; or the like. While the computing device 400 and/or any particular component of the computing device 400 may be described herein in the singular, it should be appreciated that multiple instances of the computing device 400 and/or any component thereof may be provided and functionality described in connection with the computing device 400 may be distributed across multiple computing devices 400 and/or across multiple instances of any particular component of the computing device 400.

In an illustrative configuration, the computing device 400 may include one or more processors (processor(s)) 402, one or more memory devices 404 (generically referred to herein as memory 404), one or more input/output ("I/O") interfaces 406, one or more network interfaces 408, and data storage 412. The computing device 400 may further include one or more buses 410 that functionally couple various components of the computing device 400.

The bus(es) 410 may include at least one of a system bus, a memory bus, an address bus, or a message bus, and may permit the exchange of information (e.g., data (including computer-executable code), signaling, etc.) between various components of the computing device 400. The bus(es) 410 may include, without limitation, a memory bus or a memory controller, a peripheral bus, an accelerated graphics port, and so forth. The bus(es) 410 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may provide non-volatile storage of computer-executable instructions and other data. The memory 404 and the data storage 412, removable and/or non-removable, are examples of computer-readable storage media (CRSM) as that term is used herein.

The data storage 412 may store computer-executable code, instructions, or the like that may be loadable into the memory 404 and executable by the processor(s) 402 to cause the processor(s) 402 to perform or initiate various operations. The data storage 412 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 412 for non-volatile storage.

More specifically, the data storage 412 may store one or more operating systems (O/S) 414; one or more database management systems (DBMS) 416 configured to access the memory 404 and/or one or more external datastores 426; and one or more program modules, applications, engines, managers, computer-executable code, scripts, or the like such as, for example, one or more pairwise coverage CTD vector generation modules 415; one or more test case generation modules 420; one or more test case execution modules 422; and one or more recursive test case generation modules 424. Any of the components depicted as being stored in data storage 412 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named modules/engines.

Although not depicted in FIG. 4, the data storage 412 may further store various types of data utilized by components of the computing device 400 (e.g., data stored in the datastore(s) 426). Any data stored in the data storage 412 may be loaded into the memory 404 for use by the processor(s) 402 in executing computer-executable instructions. In addition, any data stored in the data storage 412 may potentially be stored in the external datastore(s) 426 and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, managers, or the like of the computing device 400 to cause or facilitate various operations to be performed in accordance with one or more embodiments of the invention. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 412, the O/S 414 may be loaded from the data storage 412 into the memory 404 and may provide an interface between other application software executing on the computing device 400 and hardware resources of the computing device 400. More specifically, the O/S 414 may include a set of computer-executable instructions for managing hardware resources of the computing device 400 and for providing common services to other application programs. In certain example embodiments, the O/S 414 may include or otherwise control the execution of one or more of the program modules, engines, managers, or the like depicted as being stored in the data storage 412. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 412, and/or data stored in external datastore(s) 426. The DBMS 416 may use any of a variety of database models (e.g., relational model, object model, etc.) and may support any of a variety of query languages. The DBMS 416 may access data represented in one or more data schemas and stored in any suitable data repository. Data stored in the datastore(s) 426 may include, for example, architectural restrictions data; CTD vectors; CTD test case results; and so forth, any portion of which may alternatively or additionally be stored in the data storage 412. External datastore(s) 426 that may be accessible by the computing device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 400, the input/output (I/O) interface(s) 406 may facilitate the receipt of input information by the computing device 400 from one or more I/O devices as well as the output of information from the computing device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 400 may further include one or more network interfaces 408 via which the computing device 400 may communicate with any of a variety of other systems, platforms, networks, devices, and so forth. The network interface(s) 408 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 4 as being stored in the data storage 412 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 400 and/or other computing devices may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 400 may include alternate and/or additional hardware, software, or firmware components beyond those described or depicted without departing from the scope of the invention. More particularly, it should be appreciated that software, firmware, or hardware components depicted as forming part of the computing device 400 are merely illustrative and that some components may not be present or additional components may be provided in various embodiments. While various illustrative modules have been depicted and described as software modules stored in data storage 412, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 may be performed by one or more computing devices 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 3 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for expanding test space coverage for a System Under Test (SUT), the method comprising:

modeling, by an automated testing system, inputs for executing the SUT as a multitude of attributes, wherein each attribute is eligible to take on a respective one or more attribute values, and wherein a Cartesian product space comprising a collection of all possible combinations of attribute values represents an initial test space of all possible input values of the SUT;

generating, by the automated testing system, from the initial test space, an initial set of test vectors that provides complete pairwise coverage across all of the attribute values;

generating, by the automated testing system, an initial set of test cases corresponding to the initial set of test vectors;

executing, by the automated testing system, the initial set of test cases via the SUT;

reducing, by the automated testing system, the initial test space to obtain a reduced test space, wherein, the reducing comprises a plurality of iterations, each iteration comprising:

excluding, by the automated testing system, from a most recent previous iteration each combination of attribute values that corresponds to a respective test vector that is generated from a test space from the most recent previous iteration; and generating, by the automated testing system, a new set of test vectors that provides complete pairwise coverage across all of the attribute values, wherein each test vector in the new set of test vectors comprises a different combination of attribute values than each test vector in the initial set of test vectors;

generating, by the automated testing system, a new set of test cases from the new set of test vectors from the final iteration; and executing, by the automated testing system, the new set of test cases via the SUT.

2. The method of claim 1, wherein a cumulative m-wise coverage across all of the attribute values, for each m greater than 2, that is provided by the initial set of test vectors and the new set of test vectors together is greater than an m-wise coverage provided by the initial set of test vectors alone.

3. The method of claim 1, further comprising:
determining a cumulative m-wise coverage across all of the attribute values provided by the initial set of test cases and the new set of test cases together, wherein m is greater than 2.

4. The method of claim 3, wherein the new set of test vectors is a first new set of test vectors, the method further comprising:
determining that the cumulative m-wise coverage does not satisfy a threshold value indication of a desired amount of m-wise coverage; and
generating a second new set of test vectors, wherein each test vector in the second new set of test vectors comprises a different combination of attribute values than each test vector in the initial set of test vectors and each test vector in the first new set of test vectors.

5. The method of claim 4, wherein the reduced test space is a first reduced test space, the method further comprising:
reducing the first reduced test space to obtain a second reduced test space at least in part by excluding each combination of attribute values that corresponds to a respective test vector in the first new set of test vectors; and
generating, from the reduced test space, a new set of test vectors that provides complete pairwise coverage across all of the attribute values and increases the cumulative m-wise coverage.

6. The method of claim 3, further comprising:
determining that the cumulative m-wise coverage satisfies a threshold value indicative of a desired amount of m-wise coverage; and
ceasing generation of new test cases.

7. A system for expanding test space coverage for a System Under Test (SUT), the system comprising:
at least one processor; and
at least one memory storing computer-executable instructions, wherein the at least one processor is configured to access the at least one memory and execute the computer-executable instructions to:
model inputs to the SUT as a multitude of attributes, wherein each attribute is eligible to take on a respective one or more attribute values, and wherein a Cartesian product space comprising a collection of all possible combinations of attribute values represents an initial test space of all possible input values of the SUT;
generate, from the initial test space, an initial set of test vectors that provides complete pairwise coverage across all of the attribute values;
generate an initial set of test cases corresponding to the initial set of test vectors;
execute the initial set of test cases;
reduce the initial test space to obtain a reduced test space, wherein the reducing comprises a plurality of iterations, each iteration comprising:
excluding, from a most recent previous iteration, each combination of attribute values that corresponds to a respective test vector that is generated from a test space from the most recent previous iteration; and
generating a new set of test vectors that provides complete pairwise coverage across all of the attribute values, wherein each test vector in the new set of test vectors comprises a different combination of attribute values than each test vector in the initial set of test vectors;
generate a new set of test cases from the new set of test vectors from the final iteration; and
execute the new set of test cases via the SUT.

8. The system of claim 7, wherein a cumulative m-wise coverage across all of the attribute values, for each m greater than 2, that is provided by the initial set of test vectors and the new set of test vectors together is greater than an m-wise coverage provided by the initial set of test vectors alone.

9. The system of claim 7, wherein the at least one processor is further configured to execute the computer-executable instructions to:
determine a cumulative m-wise coverage across all of the attribute values provided by the initial set of test cases and the new set of test cases together, wherein m is greater than 2.

10. The system of claim 9, wherein the new set of test vectors is a first new set of test vectors, and wherein the at least one processor is further configured to execute the computer-executable instructions to:
determine that the cumulative m-wise coverage does not satisfy a threshold value indicative of a desired amount of m-wise coverage; and
generate a second new set of test vectors, wherein each test vector in the second new set of test vectors comprises a different combination of attribute values than each test vector in the initial set of test vectors and each test vector in the first new set of test vectors.

11. The system of claim 10, wherein the reduced test space is a first reduced test space, and wherein the at least one processor is further configured to execute the computer-executable instructions to:
reduce the first reduced test space to obtain a second reduced test space at least in part by excluding each combination of attribute values that corresponds to a respective test vector in the first new set of test vectors; and
generate, from the reduced test space, a new set of test vectors that provides complete pairwise coverage across all of the attribute values and increases the cumulative m-wise coverage.

12. The system of claim 9, wherein the at least one processor is further configured to execute the computer-executable instructions to:
determine that the cumulative m-wise coverage satisfies a threshold value indicative of a desired amount of m-wise coverage; and
cease generation of new test cases.

13. A computer program product for expanding test space coverage for a System Under Test (SUT), the computer program product comprising a storage medium readable by a processing circuit, the storage medium storing instructions executable by the processing circuit to cause a method to be performed, the method comprising:
modeling inputs to the SUT as a multitude of attributes, wherein each attribute is eligible to take on a respective one or more attribute values, and wherein a Cartesian product space comprising a collection of all possible combinations of attribute values represents an initial test space of all possible input values of the SUT;

generating, from the initial test space, an initial set of test vectors that provides complete pairwise coverage across all of the attribute values;

generating an initial set of test cases corresponding to the initial set of test vectors;

executing the initial set of test cases;

reducing the initial test space to obtain a reduced test space, wherein, the reducing comprises a plurality of iterations that use the initial test space, the initial set of test vectors, and the initial test cases as a first iteration, and at each subsequent iteration:

excluding, from a most recent previous iteration, each combination of attribute values that corresponds to a respective test vector that is generated from a test space from the most recent previous iteration; and generating a new set of test vectors that provides complete pairwise coverage across all of the attribute values, wherein each test vector in the new set of test vectors comprises a different combination of attribute values than each test vector in the initial set of test vectors;

generating, by the automated testing system, a new set of test cases from the new set of test vectors from the final iteration; and executing, by the automated testing system, the new set of test cases via the SUT.

14. The computer program product of claim 13, wherein a cumulative m-wise coverage across all of the attribute values, for each m greater than 2, that is provided by the initial set of test vectors and the new set of test vectors together is greater than an m-wise coverage provided by the initial set of test vectors alone.

15. The computer program product of claim 13, the method further comprising:

determining a cumulative m-wise coverage across all of the attribute values provided by the initial set of test cases and the new set of test cases together, wherein m is greater than 2.

16. The computer program product of claim 15, wherein the new set of test vectors is a first new set of test vectors, the method further comprising:

determining that the cumulative m-wise coverage does not satisfy a threshold value; and generating a second new set of test vectors, wherein each test vector in the second new set of test vectors comprises a different combination of attribute values than each test vector in the initial set of test vectors and each test vector in the first new set of test vectors.

17. The computer program product of claim 16, wherein the reduced test space is a first reduced test space, the method further comprising:

reducing the first reduced test space to obtain a second reduced test space at least in part by excluding each combination of attribute values that corresponds to a respective test vector in the first new set of test vectors; and generating, from the reduced test space, a new set of test vectors that provides complete pairwise coverage across all of the attribute values and increases the cumulative m-wise coverage.

* * * * *